United States Patent
Zhu et al.

(10) Patent No.: US 10,961,605 B2
(45) Date of Patent: Mar. 30, 2021

(54) METHOD FOR PRODUCING MAGNESIUM BY DISTILLATION

(71) Applicants: Wenxi Yuanhua Metallugry Material Co., Ltd, Shanxi (CN); Guangdong Zhu, Shanxi (CN)

(72) Inventors: Guangdong Zhu, Shanxi (CN); Junkang Ji, Shanxi (CN); Jiqing Li, Shanxi (CN)

(73) Assignees: Wenxi Yuanhua Metallugry Material Co., Ltd, Yuncheng (CN); Guangdong Zhu, Yuncheng (CN)

( * ) Notice: Subject to any disclaimer, the term of this patent is extended or adjusted under 35 U.S.C. 154(b) by 318 days.

(21) Appl. No.: 16/006,872

(22) Filed: Jun. 13, 2018

(65) Prior Publication Data

US 2019/0119782 A1  Apr. 25, 2019

(30) Foreign Application Priority Data

Oct. 24, 2017 (CN) .......................... 201711001069.6

(51) Int. Cl.

| C22B 9/02 | (2006.01) |
|---|---|
| B22D 7/00 | (2006.01) |
| B22D 2/00 | (2006.01) |
| C22B 9/00 | (2006.01) |
| C22B 26/22 | (2006.01) |
| C22B 9/04 | (2006.01) |

(52) U.S. Cl.
CPC .............. *C22B 9/02* (2013.01); *B22D 2/006* (2013.01); *B22D 7/005* (2013.01); *C22B 9/006* (2013.01); *C22B 9/04* (2013.01); *C22B 26/22* (2013.01); *Y02P 10/20* (2015.11)

(58) Field of Classification Search
CPC ....... B22D 2/006; B22D 7/005; Y02P 10/214; Y02P 10/226; Y02P 10/234; C22B 26/22; C22B 9/006; C22B 9/02; C22B 9/04
See application file for complete search history.

(56) References Cited

FOREIGN PATENT DOCUMENTS

| CN | 101386919 | 3/2009 |
|---|---|---|
| CN | 104911417 B | 1/2017 |

*Primary Examiner* — Jenny R Wu

(57) ABSTRACT

The present invention discloses a method for producing high-purity magnesium by semi-continuous distillation, comprising the following steps of: (1) melting crude magnesium or recycled mixed metal containing magnesium containing various impurities in a melting boiler; (2) feeding the molten crude magnesium into a second boiler by a magnesium liquid delivery pump, and maintaining a temperature of 665° C. to 700° C.; (3) sucking the high-temperature magnesium liquid into a crude distillation column in vacuum by a magnetic liquid suction pipe that is inserted into the intermediate boiler and connected to the crude distillation column. Magnesium is condensed into liquid in the rectification column, then discharged from a liquid seal of the rectification column, and ingoted in a refined magnesium die to obtain high-purity magnesium products.

8 Claims, 2 Drawing Sheets

METHOD FOR PRODUCING MAGNESIUM BY DISTILLATION

TECHNICAL FIELD

The present invention belongs to the field of the production of magnesium, and particularly relates to the preparation of magnesium from crude magnesium by a method.

BACKGROUND OF THE PRESENT INVENTION

Magnesium is a metal material having advantages of low density, high strength, shielding effectiveness against electromagnetic waves, no magnetism, high mobility, excellent castability, ease of processing, ease of recycling and high availability. Magnesium is widely applied in aeronautics & astronautics, weaponry, transportation means, engineering machinery, metallurgy & chemical engineering and other fields, and is a green metal to be expected to replace conventional structural materials such as steel, aluminum and copper in future.

Meanwhile, as a structural material, magnesium also has some inherent defects. Impurities in magnesium will influence various performances of magnesium. Iron, copper and nickel in the magnesium will greatly influence the corrosion resistance of magnesium. Particularly with a high content of some impurities such as copper, iron and nickel, magnesium has some more obvious defects. For example, magnesium is poor in shaping, difficult to mold, and easy to be corroded. In the smelting process of magnesium, by innovating the production processes and strengthening the process management, for example, by increasing the ignition loss of calcined dolomite, improving the reinforcement of reduced material pellets, removing powder and particles in the pellets by sieving, controlling the structure and shape of a fireproof plate in a reduction tank and the speed of opening a vacuum valve, and prolonging the deposition time of magnesium solution during the refining process, the defects of magnesium can be weakened. More importantly, improving the purity of magnesium products and reducing the content of impurities (particularly the content of iron, copper and nickel in magnesium) are effective measures to improve the corrosion resistance of magnesium. In order to improve the purity of magnesium, in addition to strengthening the process management of magnesium during the smelting, technically, impurities in magnesium can be removed by flux refining, adding titanium, zirconium, manganese or other substances, zone melting, vacuum rectification or other processes, so as to improve the purity. The solvent method, the zone melting method and the distillation method all can remove part of impurities in magnesium. In conventional rectification methods in the magnesium industry, low-boiling-point impurities and high-boiling-point impurities in magnesium are distillated separately due to the different boiling point. Thus, the whole rectification device is complicated, the energy consumption is high, the management difficulty is high, the production efficiency is low, the product cost is high, and it is disadvantageous for large-scale production. Moreover, as the range of application of magnesium will become wider in future, there will be more and more waste magnesium products and the workload for separation will become heavier. Therefore, refining the crude magnesium and recycling waste magnesium products by this process will be a good method to effectively utilize magnesium resources and have a promising prospect.

Therefore, it is necessary to design a semi-continuous distillation method which can separate high-boiling-point impurities by crude distillation and can separate low-boiling-point impurity elements at a low temperature.

SUMMARY OF THE PRESENT INVENTION

Distillation is a method for improving the purity of magnesium. The distillation includes once distillation and multiple distillations. An objective of the present invention is to provide a distillation method. Crude liquid of magnesium or waste magnesium alloy solution is added in the system by a production device using distillation. The distillation of magnesium in a crude distillation column is performed continuously. High-boiling-point impurities are separated in the crude distillation column, and the impurities are discharged from the bottom of the crude distillation column. Low-boiling-point impurities are separated in a rectification column, and the low-boiling-point impurities in a crystal state in the rectification column are discharged regularly and intermittently. Finally, the obtained high-purity liquid magnesium is discharged from the rectification column and then processed into high-purity magnesium ingots.

The present invention is realized by the following technical solutions.

A method for producing high-purity magnesium by semi-continuous distillation is provided, including the following steps of:

(1) melting crude magnesium containing various impurities or recycled mixed metal products containing waste magnesium as well as various impurities in a first melting boiler;

(2) feeding the molten crude magnesium into a second boiler by a magnesium liquid delivery pump, and maintaining a temperature of 665° C. to 700° C. to obtain high-temperature magnesium liquid;

(3) sucking the high-temperature magnesium liquid into a crude distillation column in vacuum by a magnesium liquid suction pipe which is inserted into the intermediate boiler and connected to the crude distillation column, with the depth of insertion of the pipe being always maintained at 400 mm to 500 mm;

(4) gasifying the high-temperature magnesium liquid and impurities having a low boiling point less than that of magnesium in the crude distillation column at a vacuum degree below 10 Pa and at 600° C. to 650° C. to obtain gas;

(5) feeding the gaseous magnesium and gas of metals having a boiling point lower than that of magnesium (such as zinc, potassium and sodium) in the crude distillation column into a rectification column by a pipe for communicating the crude distillation column with the rectification column, discharging a large amount of high-boiling-point impurities contained in the crude magnesium liquid in the crude distillation column by a liquid seal pipe at a high-boiling-point impurity outlet, and cooling ingots having a low content of magnesium, where the ingots are sold as magnesium powder products used for steel deoxidization and desulfurization as well as fireworks and firecrackers;

(6) cooling the magnesium vapor by a wall of the rectification column, condensing the magnesium vapor in middle and lower portions of the rectification column to obtain refined molten magnesium, discharging the refined molten magnesium from a liquid seal pipe at a high-purity magnesium outlet, and cooling and ingoting the refined molten magnesium to obtain high-purity magnetic ingot products; and (7) after condensing the magnesium vapor into liquid in the rectification column, cooling and crystallizing low-boiling-point substances in a low-boiling-point crystallizer in an upper portion of the rectification column, and recycling.

The method of the present invention is based on the purification and refining of primary products of magnesium. Impurities in the crude magnesium mainly include oxides and carbides of magnesium, oxides, carbides and nitrides of calcium, elementary substances and oxides of silicon, elementary substances and oxides of iron, and elementary substances and compounds of some nonferrous metals such as copper and nickel. These substances will be gasified under different temperature conditions. That is, these substances have different boiling points. In accordance with different boiling points of the substances, these substances are separated and purified. On this basis, the impurities are classified into high-boiling-point impurities and low-boiling-point impurities according to the boiling point of magnesium. The high-boiling-point impurities are separated by crude distillation, and the magnesium liquid obtained after the crude distillation is rectified to separate low-content impurities such as potassium, sodium and zinc, so that the high-purity magnesium is obtained eventually.

REFERENCE NUMERALS

1: regenerative burner; 2: second boiler; 3: magnesium liquid suction pipe; 4: impurity liquid-seal outlet pipe; 5: fire-resistant insulating layer; 6: distillation heating furnace; 7: thermocouple well I; 8: crude distillation column (high-boiling-point element removal column); 9: magnesium and low-boiling-point metal vapor pipe; 10: low-boiling-point crystallizer; 11: rectification column (low-boiling-point element removal column); 12: vacuum pumping pipe; 13: magnesium liquid-seal outlet pipe; 14: thermocouple well II; 15: crude magnesium and impurity outlet; 16: magnesium liquid outlet; 17: partition wall; 18: inspection window; 19: front heating chamber; 20: rear heating chamber; 21: magnesium ingot die; 22: magnesium ingot die; 23: auxiliary gas heating pipe; 24: first melting boiler; and, 25: magnesium liquid delivery pump.

DETAILED DESCRIPTION OF THE PRESENT INVENTION

Specific embodiments of the present invention will be described below in detail.

Figure 1:
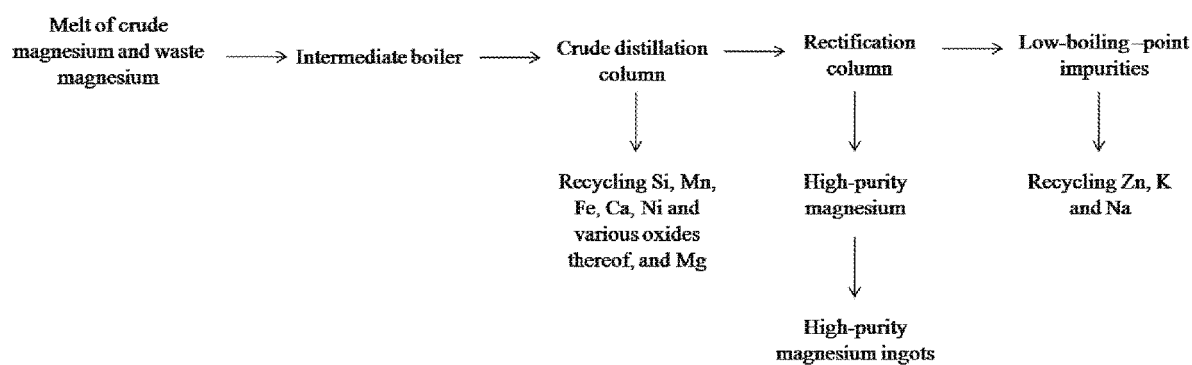
FIG. 1 shows a schematic flowchart of a process of the present invention.

A method for producing high-purity magnesium by semi-continuous distillation is provided. The process flow is shown in FIG. 1, including the following steps.

(1) Produced crude magnesium or recycled mixed metal is melted in a first melting boiler 24 containing magnesium and various impurities a first melting boiler 24.

(2) The molten crude magnesium is fed into a second boiler 2 by a magnesium liquid delivery pump 25, and a temperature of 665° C. to 700° C. is maintained.

(3) The high-temperature magnesium liquid is sucked into a crude distillation column 8 in vacuum by a suction pipe 4 which is inserted into the second boiler 2 and connected to the crude distillation column 8, where the depth of insertion is always maintained at 400 mm to 500 mm.

(4) The high-temperature magnesium liquid in the crude distillation column 8 is gasified at a vacuum degree below 10 Pa and at 600° C. to 650° C. to obtain gas, where the temperature in the front heating chamber 19 is set at about 1050° C.

(5) The magnesium vapor in the crude distillation column 8 is fed into a middle portion of a rectification column 11 by a magnesium and element vapor pipe, and impurities in the high-temperature magnesium liquid in the crude distillation column 8 are discharged from an impurity liquid-seal output pipe 5 and then cooled and ingot cast to obtain raw magnesium powder material used for steel desulfurization as well as fireworks and firecrackers.

(6) The magnesium vapor is cooled in the rectification column 11, and then condensed in middle and lower portions of the rectification column 11 to obtain refined molten magnesium, and the refined molten magnesium is discharged from a magnesium liquid-seal outlet pipe 13 and then cooled and ingot cast to obtain magnetic ingot products.

(7) After the magnesium vapor is condensed in the rectification column 11, and zinc, potassium and sodium having a boiling point lower than that of magnesium are further cooled in vacuum, crystallized by a low-boiling-point crystallizer 10 in an upper portion of the rectification column 11, and recycled. Generally, the crystallizer 10 is designed in a large volume, and the content of low-boiling-point metals is low. However, after the long-term operation, the low-boiling-point element crystallizer 10 is filled with low-boiling-point metals, and the step (6) will be stopped. Subsequently, argon will be fed into the low-boiling-point crystallizer 10 to remove the vacuum, low-boiling-point crystalized products are discharged, the low-boiling-point crystallizer 10 is replaced with a new crystallizer, and the rectification operation in the step (6) is repeated.

The distillation in the present invention is rational in design. The distillation includes two parts, i.e., crude distillation of high-boiling-point metals and rectification of low-boiling-point metals. Oxides, carbides and nitrides of silicon, iron, copper and magnesium are removed from the crude distillation column and discharged from a liquid seal on the column bottom, and potassium, sodium, zinc and other vapor in magnesium enter a rectification column. Metals having a boiling point lower than the boiling point of magnesium enter a cooling crystallizer for crystallization, and are collected regularly. High-purity magnesium is condensed into liquid in the rectification column 11, then discharged from a liquid-seal outlet pipe of the rectification column, and ingoted is cast in a refined magnesium die. The principle of the device used in this method is shown in FIG. 2.

Figure 2:
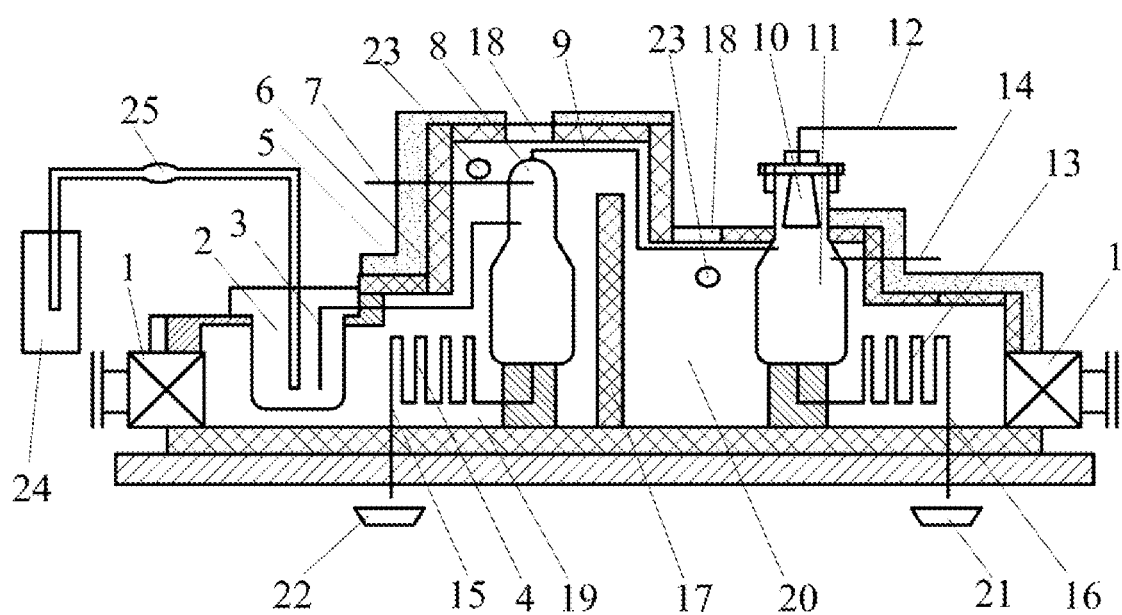
FIG. 2 shows a schematic structure diagram of a device applied in the process of the present invention.

During a specific implementation, a device for producing magnesium by distillation is shown in FIG. 2, including a distillation heating furnace 6 which is divided into a front heating chamber 19 and a rear heating chamber 20 by apartition wall 17.

As shown in FIG. 2, a regenerative burner 1, a crude distillation column 8, a liquid seal pipe 4 at a high-boiling-point impurity outlet, and a second boiler 2 are mounted inside the front heating chamber 19. The crude magnesium liquid in the intermediate boiler 2 enters an upper portion of the crude distillation column 8 through a magnesium liquid suction pipe 3. An outlet on the bottom of the crude distillation column 8 is connected to an inlet of the liquid seal pipe 4 at the high-boiling-point impurity outlet. An outlet of the liquid seal pipe 4 at the high-boiling-point impurity outlet penetrates through the front heating chamber 19 to serve as a crude magnesium high-boiling-point impurity outlet 15.

As shown in FIG. 2, the regenerative burner 1, a rectification column 11 and a magnesium liquid-seal outlet pipe 13 are mounted inside the rear heating chamber 20. A crystallizer 10 is provided on the inner top of rectification column 11 and located outside the distillation heating furnace 6. A water cooling jacket for realizing quick cooling is further provided. The top of the crude distillation column 8 is communicated with an upper portion of the rectification column 11 through a magnesium and low-boiling-point metal vapor pipe 9. The top of the rectification column 11 (on a magnesium and low-boiling-point element condensation crystallizer) is connected to a vacuum pumping pipe 12, and an outlet on the bottom of the rectification column 11 is connected to an inlet end of the magnesium liquid-seal outlet pipe 13. An output of the magnesium liquid-seal outlet pipe 13 penetrates through the heating chamber 20 to serve as a magnesium liquid outlet 16.

As shown in FIG. 2, a thermocouple well I 7 is provided on the top of the crude distillation column 8, a thermocouple well II 14 is provided in the upper portion of the rectification column 11, and both the thermocouple well I 7 and the thermocouple well II 14 penetrate through the distillation heating furnace 6. A distance from the thermocouple well I 7 to the top of the crude distillation column 8 is 400 mm, and a distance from the thermocouple well II 14 to the top of the rectification column 11 is 250 mm.

As shown in FIG. 2, an auxiliary gas heating pipe 23 is additionally provided in each of the front heating chamber 19 and the rear heating chamber 20 in order to adjust the temperature in the crude distillation column 8 and the rectification column 11. An inspection window 18 having a diameter of Φ50 mm is provided on each of the front heating chamber 19 and the rear heating chamber 20 in order to visually observe the interior temperature of the heating chambers.

The device is able to produce magnesium by a method of distilling high-boiling-point metals composed of carbides, nitrides and oxides of silicon, iron, manganese, copper, nickel and magnesium and low-boiling-point metals from crude magnesium. During the operation, the interior temperature (about 1050° C.) is controlled to be lower than the boiling point of the high-boiling-point impurities but higher than the boiling point of magnesium and low-boiling-point impurities by the regenerative burner in the front heating chamber 19. Magnesium and low-boiling-point elements such as Na, K and Zn (in a gaseous state) are distillated in the crude distillation column, and the high-boiling-point impurities (in a liquid state) such as carbides, nitrides and oxides of silicon, iron, manganese, copper, nickel and magnesium are removed and discharged from the impurity liquid-seal outlet pipe. The temperature in the rear heating chamber 20 is controlled to be lower than the boiling point of magnesium but higher than the boiling point of the low-boiling-point impurities (Na, K and Zn) by the regenerative burner 1 in the rear heating chamber 20. Subsequently, the magnesium mixture (in a gaseous state) containing magnesium and low-boiling-point impurities such as K, Na and Zn are fed into the low-boiling-point element removal column (the rectification column) through the magnesium and low-boiling-point metal vapor pipe to remove the low-boiling-point impurities (in a gaseous state) such as Zn, K and Na, expect for magnesium, and the low-boiling-point impurities are collected in the low-boiling-point crystallizer, so that the purity of magnesium is improved. The magnesium (in a liquid state) is discharged from the magnesium liquid-seal outlet pipe.

During the actual operation, in order to realize high efficiency, energy conservation, easy operation and stable quality, the whole device is made of nickel-chrome alloy steel. The device is manufactured as follows.

1. First melting boiler 24: the first melting boiler 24 is specifically used for melting crude magnesium and is provided outside the front heating chamber 19.

2. Second boiler 2: the intermediate boiler is installed for clarification of the crude magnesium liquid and vacuum sealing.

3. The second boiler is communicated with the crude distillation column through a heat-resistance stainless steel pipe. The depth of insertion of the Cr25Ni20 stainless steel pipe into the intermediate boiler is 400 mm to 500 mm, and the Cr25Ni20 stainless steel pipe is used for conveying the magnesium liquid. At a position having a distance of 400 mm away from the top of the crude distillation column, a temperature measurement bushing is inserted into the crude distillation column. In vacuum, the crude magnesium liquid is sucked into the crude distillation column by the heat-resistant stainless steel pipe inserted into the second boiler.

4. Crude distillation column 8: the crude distillation column 8 is used for removing, from the crude magnesium, impurities having a boiling point higher than that of magnesium, such as oxides, carbides and nitrides of iron, silicon, nickel, copper, manganese and magnesium.

5. Rectification column 11: the rectification column 11 is used for separating low-boiling-point elements such as zinc, potassium and sodium from the crude magnesium. Since the total content of low-boiling-point elements in magnesium in the actual production is low, solid products are collected intermittently by condensation in the process. The whole process cannot be performed continuously. Since the low-boiling-point metals can be discharged only when the amount of the low-boiling-point metals in the condenser reaches a certain amount, the whole process cannot be performed continuously.

6. A multistage U-shaped pipe is provided in the lower portion of the crude distillation column 8, so that the liquid sealing of magnesium liquid and the discharge of high-boiling-point impurities in the crude magnesium are realized.

7. A low-boiling-point impurity (zinc, potassium and sodium) collector with a water cooling condenser and a vacuum pumping pipe 12 are connected to the upper portion of the rectification column 11. A multistage U-shaped pipe is provided in the lower portion of this column to serve as the liquid seal for the magnesium liquid and the magnesium liquid outlet 16.

8. A thermocouple well I inserted into the high-boiling-point crude distillation column in a NiCr—NiSi thermocouple manner is provided on the crude distillation column at a position having a distance of 400 mm away from the top, and a thermocouple well II inserted into the rectification column in a NiCr—NiSi thermocouple manner is provided on the rectification column 11 at a position having a distance of 250 mm away from a diameter-varied position, so that the distillation temperature in the crude distillation column 8 and the rectification column 11 is controlled separately.

9. The crude distillation column 8, the rectification column 11, the U-shaped magnesium liquid seal pipe and other devices are made of nickel-chrome stainless steel. A fire-resistant insulating layer 5 is provided outside the distillation heating furnace 6. That is, a rock wool insulating layer is provided outside a fire-resistant layer for realizing thermal insulation. The adjustment of the temperature in the crude distillation column 8 and the rectification column 11 is realized by adjusting the supply of gas by an auxiliary gas heating pipe 23 that is inserted from the outside of the heating chamber. A heat-resistant auxiliary gas heating pipe 23 made of stainless steel is additionally provided in each of the front heating chamber 19 and the rear heating chamber 20, and a valve is provided for realizing adjustment. The stainless steel pipe is a Cr25Ni20 heat-resistant stainless steel pipe which has a diameter of Φ38×4.

10. The distillation device realizes heating by using natural gas, coal bed gas, producer gas, coke oven gas or other gas fuel as an energy source. The first melting boiler 24, the second boiler 2, the crude distillation column 8, the rectification column 11 and the discharge pipes realize heating by fuel gas, and the flue gas is cyclically burnt by a regenerative combustion system, outside which a heat insulating layer 5 is provided for realizing the heat exchange of the flue gas.

It should be pointed out that a person of ordinary skill in the art may make several improvements and applications without departing from the principle of the present invention, and these improvements and applications shall fall into the protection scope of the present invention.

What is claimed is:

1. A method of producing magnesium by distillation, comprising the following steps:
    a. melting crude magnesium or mixed metal containing magnesium and various impurities in a first melting boiler;
    b. feeding the molten crude magnesium liquid into a second boiler by a delivery pump, and maintaining a temperature of 665° C. to 700° C. to obtain a magnesium liquid;
    c. sucking the magnesium liquid into a crude distillation column in a vacuum condition;
    d. gasifying the magnesium liquid in the crude distillation column at a vacuum degree below 10 Pa and at 600° C. to 650° C. to obtain a magnesium vapor;
    e. feeding the magnesium vapor of step d into a rectification column, discharging impurities of carbides, nitrides and oxides of silicon, iron, manganese, copper, nickel in the magnesium liquid of step d to an impurity liquid-seal pipe outlet, cooling and casting ingot; and
    f. cooling the magnesium vapor, condensing the magnesium vapor at middle and lower portions of the rectification column to obtain refined molten magnesium, discharging the refined molten magnesium to a magnesium liquid-seal pipe outlet, cooling and casting ingot of the refined molten magnesium to obtain a magnetic ingot product, and cooling and crystallizing K, P and Na in a crystallizer at an upper portion of the rectification column;
    wherein the method is carried out in a semi-continuous distillation device for producing magnesium:
        the semi-continuous distillation device for producing magnesium comprises a distillation heating furnace wherein the distillation heating furnace is further divided into a front heating chamber and a rear heating chamber by a partition wall;
        the front heating chamber is mounted inside with a regenerative burner, a crude distillation column, an impurity liquid-seal pipe outlet, and a second boiler;
        the molten crude magnesium liquid in the second boiler (2) enters an upper portion of the crude distillation column through a suction pipe;
        the bottom of the crude distillation column is connected to an inlet end of the impurity liquid-seal pipe outlet, and an outlet end of the impurity liquid-seal pipe outlet penetrates through the front heating chamber to serve as a crude magnesium impurity outlet; and
        the rear heating chamber is mounted inside with the regenerative burner, the rectification column and a magnesium liquid-seal pipe outlet;
        a crystallizer is provided on an inner top of the rectification column, and the crystallizer is located outside the distillation heating furnace;
        the top of the crude distillation column is communicated with the upper portion of the rectification column through a magnesium and Na K and Zn vapor pipe;
        the top of the rectification column is connected to a vacuum pipe, and an outlet on the bottom of the rectification column is connected to an inlet of the magnesium liquid-seal pipe outlet; and an output of the magnesium liquid-seal pipe outlet penetrates through the rear heating chamber to serve as a magnesium liquid outlet.

2. The method of claim 1, wherein in step f, when the crystallizer is difficult to continuously collect substances atter a operation, the step f is stopped; argon is fed into the crystallizer to remove the vacuum; a low-boiling-point crystallized product is discharged; the low-boiling-point crystallizer is replaced with a new crystallizer, and the operation of step f is repeated.

3. The method of claim 1, wherein a fire-resistant insulating layer is provided outside the distillation heating furnace.

4. The method of claim 3, wherein a thermocouple well is provided on the top of the crude distillation column, and a thermocouple well II is provided in the upper portion of the rectification column, and both the thermocouple well I and the thermocouple well II penetrate through a distillation chamber.

5. The method of claim 4, wherein a distance is 400 mm to 480 mm from the thermocouple well I to the top of the crude distillation column, and a distance is 200 mm to 250 mm from the thermocouple well II to the top of the rectification column.

6. The method of claim 5, wherein a first melting boiler is provided outside the distillation heating furnace.

7. The method of claim 6, wherein an auxiliary gas heating pipe is additionally provided in each of the front heating chamber and the rear heating chamber.

8. The method of claim 6, wherein an inspection window is provided on each of the front heating chamber and the rear heating chamber.

* * * * *